(12) United States Patent
Wallrabenstein

(10) Patent No.: US 9,998,445 B2
(45) Date of Patent: Jun. 12, 2018

(54) AUTHENTICATION SYSTEM

(71) Applicant: Analog Devices, Inc., Norwood, MA (US)

(72) Inventor: John Ross Wallrabenstein, West Lafayette, IN (US)

(73) Assignee: Analog Devices, Inc., Norwood, MA (US)

( * ) Notice: Subject to any disclaimer, the term of this patent is extended or adjusted under 35 U.S.C. 154(b) by 94 days.

(21) Appl. No.: 14/718,017

(22) Filed: May 20, 2015

(65) Prior Publication Data

US 2016/0021096 A1  Jan. 21, 2016

Related U.S. Application Data

(63) Continuation of application No. 14/103,599, filed on Dec. 11, 2013.

(Continued)

(51) Int. Cl.
*H04L 9/32* (2006.01)
*H04L 9/08* (2006.01)
(Continued)

(52) U.S. Cl.
CPC ............ *H04L 63/0807* (2013.01); *G09C 1/00* (2013.01); *H04L 9/3221* (2013.01);
(Continued)

(58) Field of Classification Search
CPC .................................................. H04L 9/3278
(Continued)

(56) References Cited

U.S. PATENT DOCUMENTS 7,564,345 B2  7/2009  Devadas et al.
7,581,248 B2  8/2009  Atkins et al.
(Continued)

FOREIGN PATENT DOCUMENTS

JP  2005-073274 A  3/2005
JP  2008-545323 A  12/2008
(Continued)

OTHER PUBLICATIONS

Frikken, K. B., Blanton, M., & Atallah, M. J. (Sep. 2009). Robust authentication using physically unclonable functions. In International Conference on Information Security (pp. 262-277). Springer Berlin Heidelberg.*

(Continued)

*Primary Examiner* — Alexander Lagor
(74) *Attorney, Agent, or Firm* — Wolf, Greenfield & Sacks, P.C.

(57) ABSTRACT

A device authentication system for use with an authenticatable device having a physically-unclonable function and constructed to, in response to input, of challenge C, internally generate an output O characteristic to the PUF and the challenge C, and configured to: i) upon receiving challenge C, generate a corresponding commitment value that depends upon a private value r, and ii) upon receiving an authentication query that includes the challenge C and a nonce, return a zero knowledge proof authentication value that corresponds to the commitment value. The system comprises an enrollment server having a working verification set that includes challenge C and corresponding commitment value, wherein: a) the enrollment server is configured to generate an authentication token that corresponds to the authentication value and includes a blinded value depending upon the private value r and a random value decryptable by the authenticatable device; and/or b) the system is config- (Continued)

Enrollment and Authentication Overview ured to pre-process and convey data to the authenticatable device as part of an extended Boyko-Peinado-Venkatesan generation.

30 Claims, 4 Drawing Sheets

Related U.S. Application Data

(60) Provisional application No. 61/902,283, filed on Nov. 10, 2013.

(51) Int. Cl.
    *G06F 21/00* (2013.01)
    *H04L 29/06* (2006.01)
    *G09C 1/00* (2006.01)

(52) U.S. Cl.
    CPC .......... *H04L 9/3278* (2013.01); *H04L 63/061* (2013.01); *H04L 63/0853* (2013.01); *H04L 63/123* (2013.01); *H04L 2209/12* (2013.01); *H04L 2209/34* (2013.01)

(58) Field of Classification Search
    USPC ............. 713/174, 189, 194; 726/2, 7, 26, 30
    See application file for complete search history.

(56) References Cited

U.S. PATENT DOCUMENTS

| | | |
|---|---|---|
| 7,653,197 B2 | 1/2010 | Van Dijk |
| 7,702,927 B2 | 4/2010 | Devadas et al. |
| 7,839,278 B2 | 11/2010 | Devadas et al. |
| 7,926,089 B2 | 4/2011 | Tulshibagwale et al. |
| 7,962,516 B2 | 6/2011 | Bahrs et al. |
| 8,281,127 B2 | 10/2012 | Hayes |
| 8,290,150 B2 | 10/2012 | Erhart et al. |
| 8,346,951 B2 | 1/2013 | Hayes |
| 8,379,856 B2 | 2/2013 | Potkonjak |
| 8,386,990 B1 | 2/2013 | Trimberger et al. |
| 8,418,006 B1 | 4/2013 | Trimberger |
| 8,458,489 B2 | 6/2013 | Beckmann et al. |
| 8,463,813 B2 | 6/2013 | Siress et al. |
| 8,468,186 B2 | 6/2013 | Yu |
| 8,510,608 B2 | 8/2013 | Futa et al. |
| 8,516,269 B1 | 8/2013 | Hamlet et al. |
| 8,525,169 B1 | 9/2013 | Edelstein et al. |
| 8,566,579 B2 | 10/2013 | Armstrong et al. |
| 8,667,265 B1 | 3/2014 | Hamlet et al. |
| 8,782,396 B2 | 7/2014 | Ziola et al. |
| 8,848,905 B1 | 9/2014 | Hamlet et al. |
| 8,918,647 B1 | 12/2014 | Wallrabenstein |
| 2005/0149496 A1 | 7/2005 | Mukherjee et al. |
| 2005/0210252 A1 | 9/2005 | Freeman et al. |
| 2005/0222896 A1 | 10/2005 | Rhyne et al. |
| 2007/0036353 A1 | 2/2007 | Reznik et al. |
| 2008/0069341 A1 | 3/2008 | Relyea |
| 2008/0256549 A1 | 10/2008 | Liu et al. |
| 2008/0256600 A1 | 10/2008 | Schrijen et al. |
| 2009/0063860 A1 | 3/2009 | Barnett et al. |
| 2009/0083833 A1 | 3/2009 | Ziola et al. |
| 2010/0031065 A1 | 2/2010 | Futa et al. |
| 2010/0122093 A1 | 5/2010 | Tuyls et al. |
| 2010/0127822 A1 | 5/2010 | Devadas |
| 2010/0272255 A1 | 10/2010 | Devadas et al. |
| 2011/0033041 A1 | 2/2011 | Yu et al. |
| 2011/0215829 A1 | 9/2011 | Guajardo Merchan et al. |
| 2011/0299678 A1 | 12/2011 | Deas et al. |
| 2012/0072717 A1 | 3/2012 | Hayes |
| 2012/0072737 A1 | 3/2012 | Schrijen et al. |
| 2012/0114261 A1 | 5/2012 | Cheon |
| 2012/0137137 A1 | 5/2012 | Brickell et al. |
| 2012/0183135 A1 | 7/2012 | Paral et al. |
| 2015/0134966 A1 | 5/2015 | Wallrabenstein |
| 2015/0195088 A1 | 7/2015 | Rostami et al. |
| 2015/0341792 A1 | 11/2015 | Walsh et al. |

FOREIGN PATENT DOCUMENTS

| | | |
|---|---|---|
| JP | 2009-517910 A | 4/2009 |
| JP | 2011-526113 A | 9/2011 |
| KR | 10-2008-0029841 A | 4/2008 |
| KR | 20090104421 A | 10/2009 |
| WO | WO 10/105993 A2 | 9/2010 |

OTHER PUBLICATIONS

Boyko, V., Peinado, M., & Venkatesan, R. (May 1998). Speeding up discrete log and factoring based schemes via precomputations. In International Conference on the Theory and Applications of Cryptographic Techniques (pp. 221-235). Springer Berlin Heidelberg.*
International Search Report and Written Opinion for International Application No. PCT/US2014/064738 dated Sep. 1, 2015.
International Preliminary Report on Patentability for International Application No. PCT/US2014/064738 dated Jan. 22, 2016.
Abercrombie et al., "Secure Cryptographic Key Management System (CKMS) Considerations for Smart Grid Devices," CSIIRW '11 Proceedings of the Seventh Annual Workshop on Cyber Security and Information Intelligence Research, Article No. 59, ACM, New York, 2011.
Armknecht et al., "A formalization of the security features of physical functions," Proceedings of the 2011 IEEE Symposium on Security and Privacy, SP '11, pp. 397-412, Washington, DC, 2011, IEEE Computer Society.
Bose et al., "On a class of error correcting binary group codes," Information and Control, 3(1):68-79, 1960.
Brzuska et al., "Physically uncloneable functions in the universal composition framework," Advances in Cryptology—CRYPTO 2011—31st Annual Cryptology Conference, vol. 6841 of Lecture Notes in Computer Science, p. 51, 2011 Springer.
Canetti, "Universally composable security: A new paradigm for cryptographic protocols," Proceedings of the 42nd IEEE symposium on Foundations of Computer Science, FOCS '01, pp. 136-, Washington, DC, 2001, IEEE Computer Society.
Chaum et al., "An improved protocol for demonstrating possession of discrete logarithms and some generalizations," Proceedings of the 6th annual international conference on Theory and application of cryptographic techniques, EUROCRYPT'87, pp. 127-141, Berlin, Heidelberg, 1988, Springer-Verlag.
Chen et al., "New algorithms for secure outsourcing of modular exponentiations," Computer Security, ESORICS 2012, vol. 7459 of Lecture Notes in Computer Science, pp. 541-556, Springer Berlin Heidelberg, 2012.
Dodis et al., "How to generate strong keys from biometrics and other noisy data," SIAM J. Comput., 38(1):97-139, Mar. 2008.
Fiege et al., "Zero Knowledge Proofs of Identity," Proceedings of the Nineteenth Annual ACM Symposium on Theory of Computing (STOC), 1987.
Frikken et al. Robust Authentication Using Physically Unclonable Functions. 2009.
Frikken et al., "Robust Authentication Using Physically Unclonable Functions," 12th International Conference, ISC 2009, Pisa, Italy, Sep. 7-9, 2009, Information Security Lecture Notes in Computer Science, vol. 5735, 2009, pp. 262-277.
Gardner et al., "Toward Trusted Embedded Systems," 2nd Annual NSA Trusted Computing Conference & Exposition, Sep. 21, 2011, Orlando, FL.
Gassend et al., "Silicon physical random functions," Proceedings of the 9th ACM conference on Computer and communications security, CCS '02, pp. 148-160, New York, NY, 2002.
Goldwasser et al., "One-time programs, Proceedings of the 28th Annual conference on Cryptology: Advances in Cryptology," CRYPTO 2008, pp. 39-56, Berlin, Heidelberg, 2008, Springer-Verlag.

(56) References Cited

OTHER PUBLICATIONS

Guajardo et al., "FPGA intrinsic PUFs and Their Use for IP Protection," Proceedings of the 9th Cryptographic Hardware and Embedded Systems Workshop (CHES), vol. 4727, 2007.
Guajardo et al., "Physical Unclonable Functions and Public-Key Crypto for FPGA IP Protection," International Conference on Field Programmable Logic and Applications, 2007.
Handschuh et al., "Hardware intrinsic security from physically unclonable functions," Towards Hardware-Intrinsic Security, Information Security and Cryptography, pp. 39-53, Springer Berlin Heidelberg, 2010.
Holcomb et al., "Initial sram state as a fingerprint and source of true random numbers for rfid tags," Proceedings of the Conference on RFID Security, 2007.
Juels et al., "A fuzzy commitment scheme," Proceedings of the 6th ACM conference on Computer and communications security, CCS '99, pp. 28-36, New York, NY, 1999, ACM.
Katzenbeisser et al., "Pufs: Myth, fact or busted? a security evaluation of physically unclonable functions (pufs) cast in silicon," CHES, pp. 283-301, 2012, Springer.
Kuppusamy Modelling Client Puzzles and Denial-of-Service Resistant Protocols. Information Security Institute. Science and Engineering Faculty. Queensland University of Technology. 2012. Available at: http://eprints.qut.edu.au/61032/1/Lakshmi_Kuppusamy_Thesis.pdf.
Kerr et al., "PEAR: A Hardware Based Protocol Authentication System," SPRINGL '10 Proceedings of the 3rd ACM SIGSPATIAL International Workshop on Security and Privacy in GIS and LBS, ACM, New York, 2010.
Kerr, "Secure Physical System Design Leveraging PUF Technology," Master's Thesis, Univ. of Purdue, 2012.
Khandavilli, "A Mobile Role Based Access Control System Using Identity Based Encryption With Non-Interactive Zero Knowledge Proof of Authentication," Dalhousie University Repository, Faculty of Graduate Studies Online Theses, Apr. 5, 2012.
Kirkpatrick et al., "Enforcing Physically Restricted Access Control for Remote Data," Proceedings of CODASPY, 2011.
Kirkpatrick et al., "Physically Restricted Authentication and Encryption for Cyber-physical Systems," OHS Workshop on Future Directions in Cyber-physical Systems Security, 2009.
Kirkpatrick et al., "PUF ROKs: A Hardware Approach to Read-Once Keys," Proceedings of the 6th ACM Symposium on Information, Computer and Communications Security, ASIACCS 2011, Hong Kong, China, Mar. 22-24, 2011.
Kirkpatrick et al., "PUF ROKs: Generating Read-Once Keys with Physically Unclonable Functions (Extended Abstract)," 6th Annual Cyber Security and Information Intelligence Research Workshop, Oak Ridge, TN, Apr. 21-23, 2010, Proceedings of the Sixth Annual Workshop on Cyber Security and Information Intelligence Research.
Kish et al., "Physical Uncloneable Function Hardware Keys Utilizing Kirchhoff-Law Johnson-Noise Secure Key Exchange and Noise-Based Logic," Fluctuation and Noise Letters 12, 2013.
Kumar et al., "Extended abstract: The butterfly puf protecting ip on every fpga," Hardware-Oriented Security and Trust, HOST 2008, IEEE International Workshop on, pp. 67-70, 2008.
Maiti et al., "Physical Unclonable Function and True Random Number Generator: a Compact and Scalable Implementation," GLSVLSI '09 Proceedings of the 19th ACM Great Lakes symposium on VLSI, ACM, New York, 2009.
Maiti et al., "The impact of aging on an fpga-based physical unclonable function," Field Programmable Logic and Applications (FPL), 2011 International Conference on, pp. 151-156, 2011.
Nabeel et al., "Authentication and Key Management for Advanced Metering Infrastructures Utilizing Physically Unclonable Functions," IEEE SmartGridComm 2012 Symposium—Cyber Security and Privacy, 2012.
Nguyen et al. Distribution of Modular Sums and the Security of the Server Aided Exponentiation. 2001.

Nguyen et al., "Distribution of modular sums and the security of the Server aided exponentiation," Cryptography and Computational Number Theory, vol. 20 of Progress in Computer Science and Applied Logic, pp. 331-342, 2001.
Paral et al., "Reliable and efficient puf-based key generation using pattern matching," Hardware-Oriented Security and Trust (HOST), 2011 IEEE International Symposium, pp. 128-133, Jun. 2011.
Potkonjak et al., "Differential Public Physically Unclonable Functions: Architecture and Applications," DAG '11 Proceedings of the 48th Design Automation Conference, ACM, New York, 2011.
Ravikanth, "Physical one-way functions," PhD thesis, 2001, AAI0803255.
Rohrmair et al., "Applications of high-capacity crossbar memories in cryptography," IEEE Trans. Nanotechnol., 10 (3):489-498, May 2011.
Rohrmair et al., "Modeling attacks on physical unclonable functions," Proceedings of the 17th ACM conference on Computer and communications security, CCS '10, pp. 237-249, New York, NY, 2010.
Rohrmair et al., "Puls in security protocols: Attack models and security evaluations," 2013 IEEE Symposium on Security and Privacy, 0:286-300, 2013.
Shao, "Strong designated verifier signature scheme: new definition and construction," Zhejiang University of Science and Technology, IACR Cryptology ePrint Archive, Zhejiang, China, 2010.
Suh et al., "Physical unclonable functions for device authentication and secret key generation," Proceedings of the 44th annual Design Automation Conference, DAC '07, pp. 9-14, New York, NY, 2007.
Tuyls et al., "Read-proof hardware from protective coatings," Proceedings of the 8th international conference on Cryptographic Hardware and Embedded Systems, CHES'06, pp. 369-383, Berlin, Heidelberg, 2006, Springer-Verlag.
Van Dijk et al., "Physical unclonable functions in cryptographic protocols: Security proofs and impossibility results," Cryptology ePrint Archive, Report 2012/228, 2012.
Wu et al., "On foundation and construction of physical unclonable functions," received Mar. 31, 2010, at http://eprint. iacr.org/2010/171.j.wu@ecit.qub.ac.uk 14699.
Yu et al., "Lightweight and secure puf key storage using limits of machine learning," Proceedings of the 13th international conference on Cryptographic hardware and embedded systems, CHES'11, pp. 358-373, Berlin, Heidelberg, 2011, Springer-Verlag.
Yu et al., "Recombination of physical unclonable functions," GOMACTech, 2010.
Yu et al., "Secure and robust error correction for physical unclonable functions," IEEE Des. Test, 27 (1):48-65, Jan. 2010.
Invitation to Pay Additional Fees dated Aug. 26, 2015 for Application No. PCT/US2015/032320.
International Search Report and Written Opinion dated Nov. 6, 2015 for Application No. PCT/US2015/032320.
International Preliminary Report on Patentability dated Aug. 4, 2016 for Application No. PCT/US2015/032320.
[No Author Listed], What is MAC address/Burned In Addressses(BIA)/Ethernet addresses? Creative World9. Apr. 16, 2012. http://www.creativeworld9.com/2012/06/what-is-mac-addressburned-in.html [last accessed Mar. 26, 2017]. 1 page.
Juels et al., A Fuzzy Commitment Scheme. Proceedings of the 6th ACM Conference on Computer and Communications Security, CCS '99. 1999;28-36.
Lee et al., A technique to build a secret key in integrated circuits for identification and authentication applications. IEEE Symposium on VLSI Circuits: Digest of Technical Papers. 2004;176-9.
Zheng et al., How to Construct Efficient Signcryption Schemes on Elliptic Curves. Inf Proc Lett. 1998;68(5):227-33.
Zheng, Digital Signcryption or How to Achieve Cost(Signature & Encryption) « Cost(Signature) + Cost(Encryption). Advances in Cryptology. CRYPTO '97. 1997;1294:165-79.
Extended European Search Report dated Dec. 18, 2017 in connection with European Application No. EP 15795660.8.
Shao, Efficient deniable authentication protocol based on generalized ElGamal signature scheme. Computer Standards & Interfaces. 2004;26(5):449-54.

(56) References Cited

OTHER PUBLICATIONS

Shao et al., A Non-interactive Deniable Authentication Protocol based on Elliptic Curve Discrete Logarithm Problem. Energy Procedia. Jan. 1, 2011;11:1018-25.

* cited by examiner

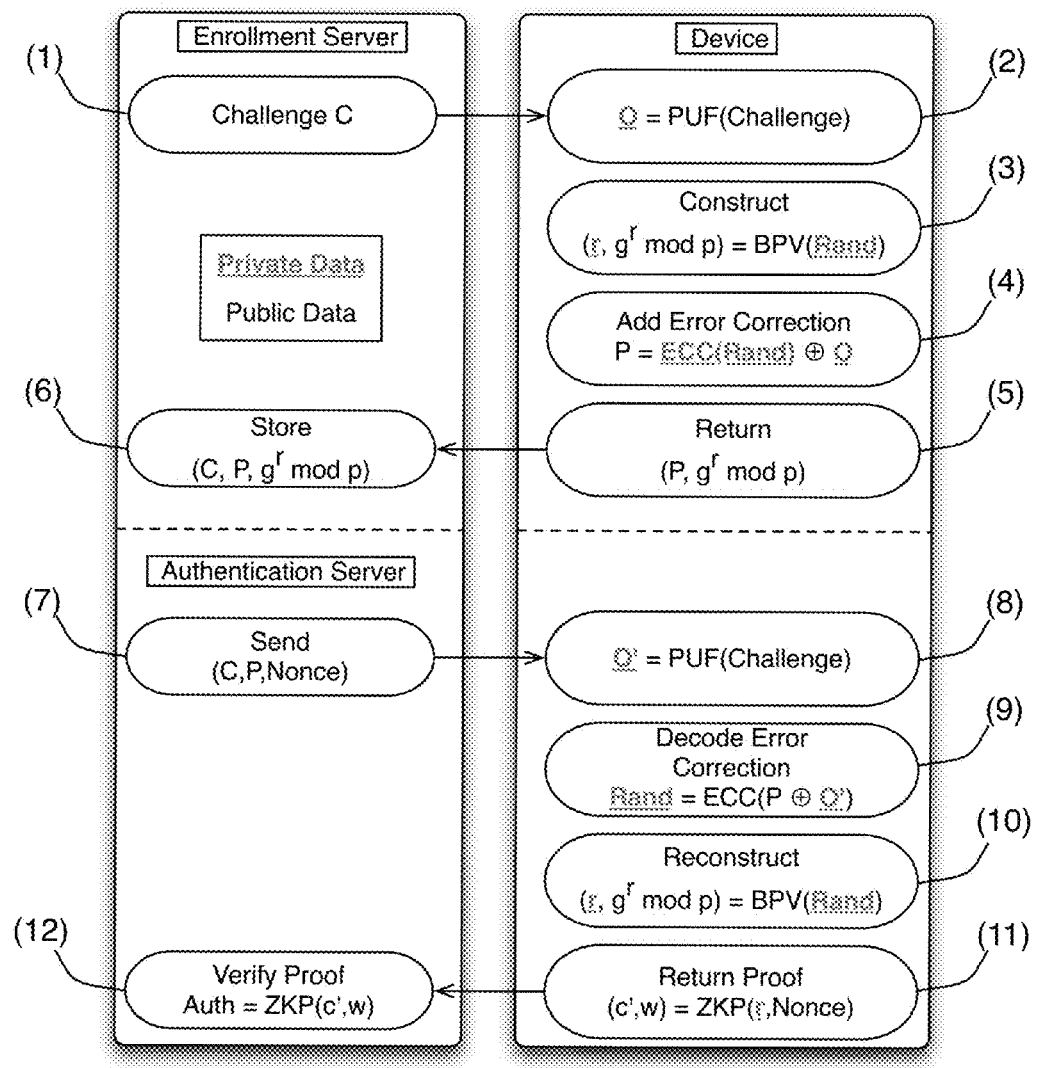
Fig. 1 Enrollment and Authentication Overview

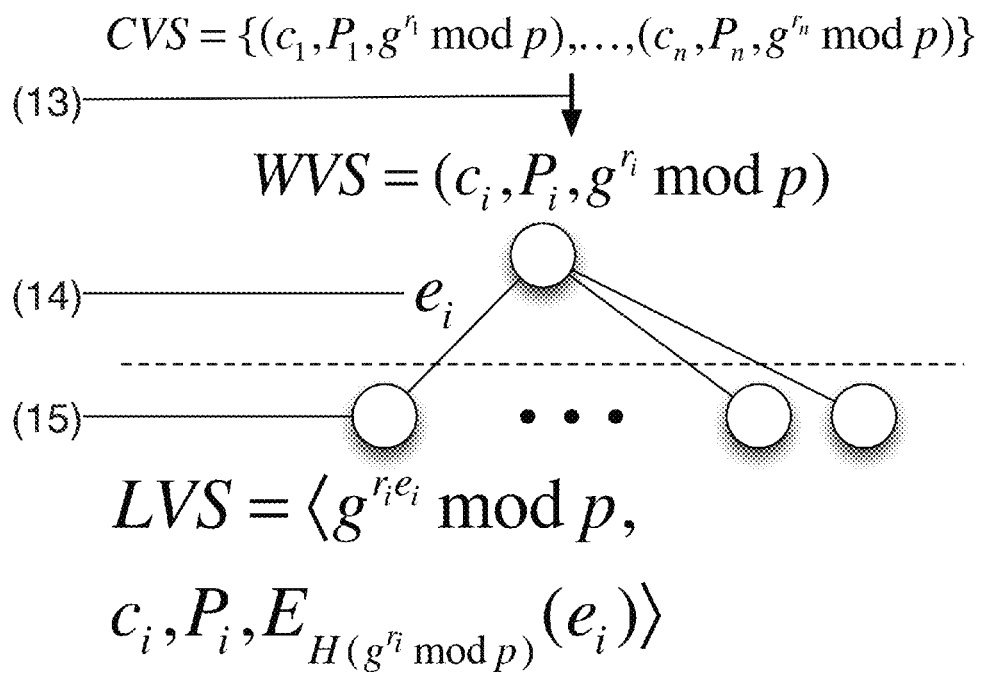
Fig. 2 Enrollment Derivation Tree
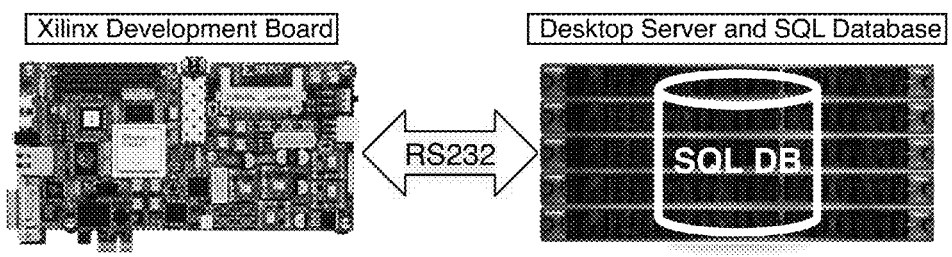
Fig. 3 Experimental Setup

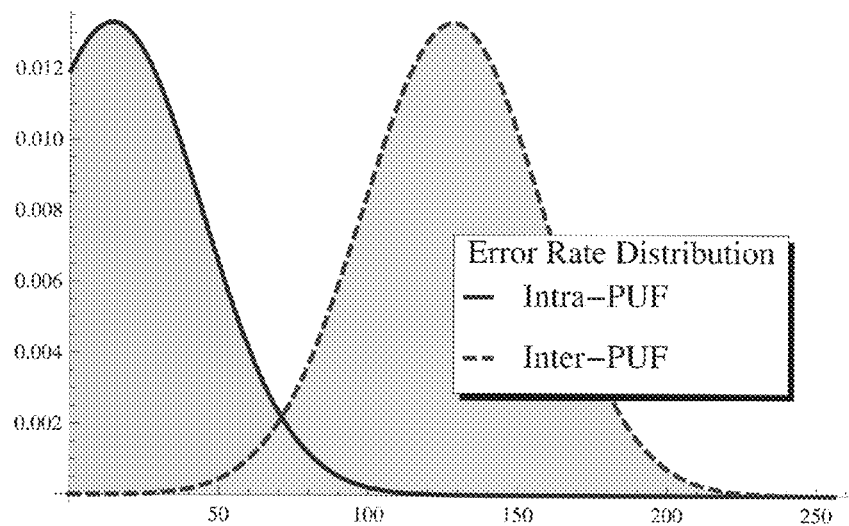
Fig. 4 Overlapping Error Distributions
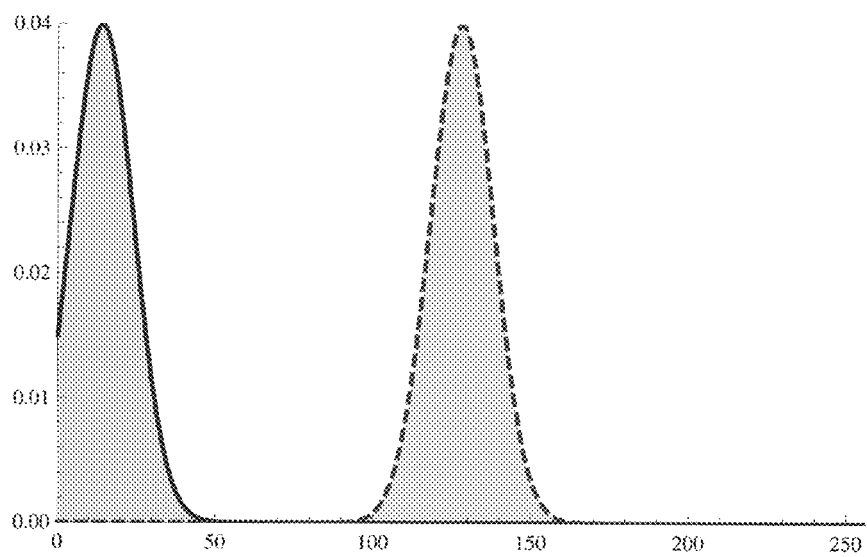
Fig. 5 Separated Error Distributions

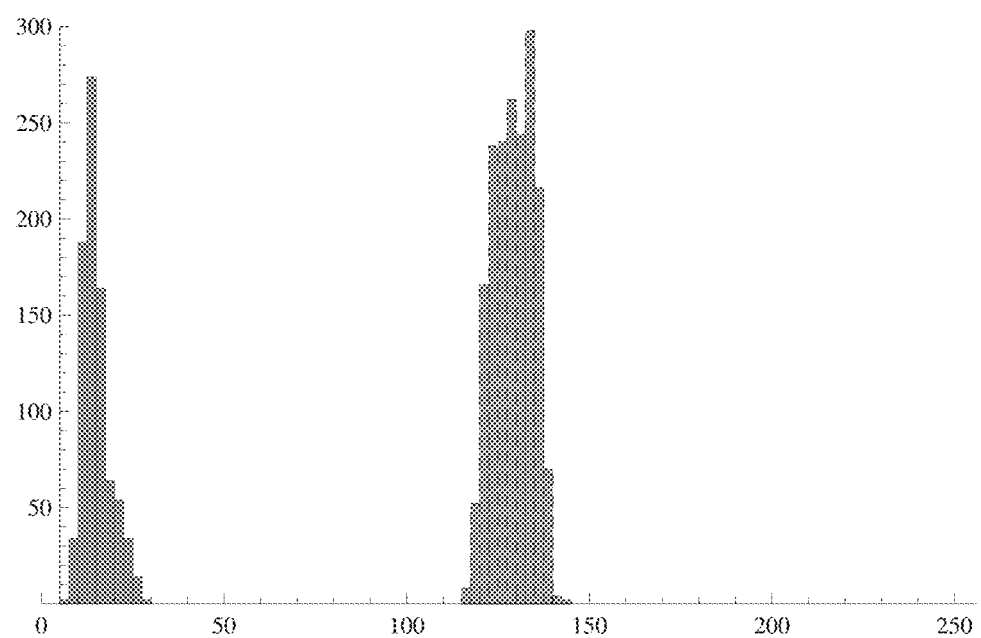
Fig. 6 True (Observed) Error Distributions

US 9,998,445 B2

AUTHENTICATION SYSTEM

CROSS REFERENCE TO RELATED APPLICATIONS

This application is a continuation of application Ser. No. 14/103,599, filed Dec. 11, 2013, and claims the benefit of provisional application Ser. No. 61/902,283 filed Nov. 10, 2013, which is incorporated by reference here including its Introduction and other matter not expressly set forth here. The contents of U.S. Patent Application Publication No. 2013/0212642 and Applicant's co-pending U.S. patent application Ser. No. 13/829,826 are also incorporated here by reference, in particular their disclosure of a Resilient Device Authentication System, with which suitable embodiments of the system described herein can be used.

FIELD OF THE INVENTION

This disclosure relates generally to hardware verification, and in particular but not exclusively, to binding authentication to protect against tampering and subversion by substitution.

BACKGROUND OF THE INVENTION

The unique properties of PUFs provide several advantages over traditional public key infrastructure (PKI) constructions. In general, PUFs provide two core properties: tamper detection for a larger circuit, and to act as a noisy random oracle. The first property follows from the physical design of the PUF itself. As the PUF relies on unclonable hardware tolerances (e.g. wire delays, resistance, etc.), any modification to either the PUF or the attached integrated circuit will irreversibly alter the PUF's mapping from challenges to responses. The second property is assumed in ideal theoretical models, where PUFs are treated as oracles that provide (noisy) responses to challenges, where the mapping between challenges and responses cannot be modeled or duplicated in hardware. Rührmair et al. ("Modeling attacks on physical unclonable functions," *Proceedings of the 17th ACM conference on Computer and Communications Security*, CCS'10, pages 237-249, New York, 2010, ACM ("Rührmair I")) have refuted the claim of modeling robustness, and propose a hardware construction resilient to such attacks (Rührmair et al., "Applications of high-capacity crossbar memories in cryptography," *IEEE Trans. Nanotechnology.* 10(3):489-498, May 2011 ("Rührmair II")). Thus, theoretical constructions assuming that PUFs cannot be modeled remain interesting, as existing PUF hardware can be replaced with Rührmair et al.'s (Rührmair II) proposed design.

Literature on physically unclonable functions (PUFs) evaluates the properties of PUF hardware design (e.g., Gassend et al., "Silicon physical random functions," *Proceedings of the 9th ACM conference on Computer and Communications Security*, CCS'02, pages 148-160, New York, 2002, ACM.; Katzenbeisser et al., "PUFs: Myth, fact or busted?A security evaluation of physically unclonable functions (PUFs) cast in Silicon," *CHES*, pages 283-301, Springer, 2012; Ravikanth, "Physical One-Way Functions," Ph.D. Thesis, 2001; Rührmair II; Suh et al., "Physical Unclonable Functions for Device Authentication and Secret Key Generation," *Proceedings of the 44th Annual Design Automation Conference*, DAC'07, pages 9-14, New York, 2007, ACM; Yu et al., "Recombination of Physical Unclonable Functions," GOMACTech, 2010 ("Yu I")), provides formal theoretical models of PUF properties, and designs protocols around those definitions (cf. Armknecht et al., "A formalization of the security features of physical functions," *Proceedings of the 2011 IEEE Symposium on Security and Privacy*, SP'11, pages 397-412, Washington, D.C., 2011; Brzuska et al., "Physically uncloneable functions in the universal composition framework," *Advances in Cryptology-CRYPTO 2011-31st Annual Cryptology Conference*, vol. 6841 of *Lecture Notes in Computer Science*, page 51. Springer, 2011; Frikken et al., "Robust authentication using physically unclonable functions," *Information Security*, vol. 5735 of *Lecture Notes in Computer Science*, pages 262-277, Springer Berlin Heidelberg, 2009; Handschuh et al., "Hardware intrinsic security from physically unclonable functions," *Towards Hardware-Intrinsic Security*, Information Security and Cryptography, pages 39-53, Springer Berlin Heidelberg, 2010; Kirkpatrick et al., "PUF ROKs: A hardware approach to read-once keys," *Proceedings of the 6th ACM Symposium on Information, Computer and Communications Security*, ASIACCS'11, pages 155-164, New York, 2011, ACM; Paral et al., "Reliable and efficient PUF-based key generation using pattern matching," *Hardware-Oriented Security and Trust (HOST)*, 2011 IEEE International Symposium, pages 128-133. June 2011; Rührmair et al., "PUFs in Security Protocols: Attack Models and Security Evaluations," 2013 *IEEE Symposium on Security and Privacy*, pages 286-300, 2013 ("Rührmair III"); van Dijk et al., "Physical Unclonable Functions in Cryptographic Protocols: Security Proofs and Impossibility Results," *Cryptology ePrint Archive*, Report 2012/228, 2012; Wu et al., "On foundation and construction of physical unclonable functions," *Cryptology ePrint Archive*, Report 2010/171, 2010; Yu et al., "Lightweight and Secure PUF Key Storage using limits of Machine Learning," *Proceedings of the 13th International Conference on Cryptographic Hardware and Embedded Systems*, CHES'11, pages 358-373, Berlin, Heidelberg, 2011, Springer-Verlag ("Yu II")).

Ravikanth introduced the notion of physical one-way functions in his Ph.D. dissertation. The physical construction is based on optics, using the speckle pattern of a laser fired through a semi-transparent gel to construct an unclonable and one-way function. This seminal work led to more realistic constructions of physically unclonable functions (PUFs) that did not rely on precise mechanical alignment and measurements.

Gassend et al. introduce the notion of PUFs constructed through integrated circuits. This work improves upon the original physical one-way function construction using optics by Ravikanth by removing the precise requirements necessary for mechanical alignment and output measurement. By implementing PUFs in integrated circuits, the hardware is widely available, and easy to integrate into existing systems.

Suh et al. introduced the ring oscillator construction of a PUF, which has many desirable properties. Specifically, the ring oscillator design is easy to implement in hardware, robust, and unpredictable. The authors demonstrate that ring oscillator constructions exhibit 46% inter-chip variation, yet have only 0.5% intra-chip variation.

Rührmair et al. describe a candidate direction to alleviate the problems with existing PUF constructions caused by machine learning demonstrated in Rührmair I. They introduce the notion of a super high information content (SHIC) PUF. A SHIC-PUF contains a large amount of information (e.g. $10^{10}$ bits) while having a self-imposed slow readout rate that is not circumventable by construction. Thus, if an adversary attempts to acquire the full challenge-response pair set, the time required to achieve this would exceed the lifetime of the device. Using lithographic crossbar memory, a small PUF would require at least three years of continuous reading to fully model. As nanotechnology develops, the promise of a nonlithographic crossbar (≈10-nm) would require decades to fully model. Thus, the security of the SHIC-PUF is independent of the computational abilities of the adversary and inherently linked to the physical construction. Further, the crossbar can be used as an overlay PUF, which protects the underlying circuitry.

Yu I describe PUF constructions that treat the unique hardware characteristics of devices as genetic material. Similar to genetic recombination, these properties may be recombined to produce output with different characteristics than the original material. In the authors' construction, a PUF may be altered to provide NIST certifiable random output, an exponential challenge space and real-valued outputs. True random output is a necessary characteristic for use in cryptographically strong authentication protocols. The real valued output facilitates soft decision error correction, where both the signal and strength are reported (Yu et al., "Secure and Robust Error Correction for Physical Unclonable Functions," *IEEE Des. Test*, 27 (1):48-65, January 2010, ("Yu III")). Finally, the authors also demonstrate how to construct a multi-modal PUF, with separate generation and authentication modes.

Katzenbeisser et al. evaluate the assumed properties of various PUF constructions, finding that many lack essential characteristics of an ideal PUF. The arbiter, ring oscillator, SRAM, flip-flop and latch PUF constructions are compared for robustness and unpredictability in varying environmental conditions. While all PUF constructions are acceptably robust, the arbiter PUF has low entropy while flip-flop and latch PUFs are heavily affected by temperature fluctuations. A drawback for ring oscillators is low min-entropy, while SRAM lacks an exponential input space. However, both ring oscillator and SRAM designs more closely approximate an ideal PUF.

Next, we review the literature on applying PUFs to cryptographic protocols, and developing formal models to evaluate the security of PUF-dependent protocols.

Handschuh et al. give a high level description of how PUFs can be applied to anti-counterfeit and intellectual property domains. The authors outline the shortcomings of existing property protection approaches, which is primarily key storage design. By employing PUFs, the secret key is no longer duplicable, as PUFs are by design unclonable.

Rührmair I describe attacks on a variety of PUF constructions, including arbiter and ring oscillator designs. The modeling attacks require only a linear number of challenge response pairs with respect to the structural parameters of the PUF constructions. In constructions where the attacks require superpolynomially many challenge response pairs, the underlying construction grows superpolynomially in the number of components. Thus, the underlying construction becomes infeasible to build, and the designer and adversary face the same asymptotic difficulty. The attacks presented are sufficient to break most PUF constructions in production, and demonstrate that other approaches seem to meet with exponential increases in complexity for both defender and adversary.

Wu et al. demonstrate that a PUF with l-bit input, m-bit output and n components does not implement a random function when $$n < \frac{m2^\ell}{c}$$

for some constant c. That is, the size of a random function family must be equal to the size of the output domain. Letting $\mathcal{F}$ be a function family of PUFs and $\mathcal{Z}$ be the output domain, we have that $\mathcal{Z} = 2^{m2^\ell}$. However, when $$|\mathcal{F}| = n < \frac{m2^\ell}{c},$$

then $$|\mathcal{F}| = 2^{\frac{2^{m2^\ell}}{c}} < 2^{m2^\ell} = |\mathcal{Z}|.$$

This information theoretic bound establishes PUFs with $$n < \frac{m2^\ell}{c}$$

components as a pseudorandom function family. In order for such PUF families to implement a proper psuedorandom family, confusion and diffusion of the input are necessary. The authors show how to construct a physically unclonable pseudorandom permutation by using a PUF to generate the key for a block cipher. Finally, the authors construct a secure helper data algorithm called the majority voting dark bit for error correction that is more efficient than standard soft decision error correcting codes.

Yu II describe a machine learning based rationale for security by considering an adversary's advantage against PUFs with a given classification error. By assuming that a PUF with k bits in the parameter requires at least k challenge-response pairs to gain a classification advantage, the authors conclude that a classification error rate of 0.5 is equivalent to security. Technically, the authors should specify that this result would only apply to PUFs with a single bit output. By removing the assumption that the output of a PUF is independent and identically distributed (i.i.d.), the complexity of the PUF can be reduced in addition to reducing the complexity of the error correcting code.

Kirkpatrick et al. describe how to use PUFs to generate read-once keys, where upon use the key is immediately destroyed and further use is impossible. Such a construction would facilitate one-time programs as proposed by Goldwasser et al. ("One-time Programs." *Proceedings of the 28th Annual Conference on Cryptology: Advances in Cryptology*, CRYPTO 2008, pages 39-56, Berlin, Heidelberg, 2008, Springer-Verlag). The PUF-ROK construction requires integration with a register that stores an initial seed value, which is the effective security parameter. The PUF and register are in a feedback loop, so upon reading the output of the PUF the initial key is permanently destroyed. The authors also describe how to allow decryption with read-once keys in an arbitrary order. Thus, an effective k-read key can be constructed.

Armknecht et al. give formal security definitions for the desirable properties of a PUF. Existing models did not allow the broad range of PUF constructions to be accurately modeled, for example by requiring the PUF to act as a physical one-way function. With the introduction of PUFs that output only a single bit, inversion becomes trivial. The authors' PUF model requires robustness, physical unclonability and unpredictability, and formal security definitions and games are given to demonstrate that a PUF construction is secure. This facilitates the use of PUFs in cryptographic protocols, where the security of protocols must be reducible to existing hard problems.

Brzuska et al. construct cryptographic protocols for oblivious transfer, bit commitment and key exchange using PUFs in a univerally composable framework. The universally composable (UC) framework of Canetti ("Universally Composable Security: A new paradigm for cryptographic protocols," *Proceedings of the 42nd IEEE Symposium on Foundations of Computer Science*, FOCS'01, Washington, D.C., 2001, IEEE Computer Society) facilitates security proofs of protocols to be derived from sub-protocols in an arbitrary system.

The work of van Dijk et al. improves upon the work of Brzuska et al. by considering more realistic attack scenarios for cryptographic protocols involving PUF devices. Specifically, the authors' new security model focuses on when an adversary has access to the PUF device during a protocol. The authors demonstrate that any protocol for oblivious transfer or key exchange based solely on the use of a PUF is impossible when the adversary has posterior access to the PUF. Similar impossibility results are given for other security models, even when the PUF is modeled as an ideal random permutation oracle. The authors introduce formal security definitions in three models, and give novel protocols for bit commitment, key exchange and oblivious transfer under a subset of these models. Finally, the authors demonstrate that the application of Brzuska et al. to the universally composable framework of Canetti is not valid in these security models, and should be considered an open problem.

SUMMARY OF THE INVENTION

A device authentication system according to the present invention is for use with an authenticatable device having a physically-unclonable function ("PUF") and constructed so as to, in response to the input of a specific challenge C, internally generate an output O that is characteristic to the PUF and the specific challenge C, the authenticatable device configured to: i) upon receiving the specific challenge C, generate a corresponding commitment value that depends upon a private value r, and ii) upon receiving an authentication query that includes the specific challenge C and a nonce, return a zero knowledge proof authentication value that corresponds to the commitment value. The device authentication system comprises an enrollment server having a working verification set that includes the specific challenge C and the authenticatable device's corresponding commitment value, wherein: a) the enrollment server is configured to generate an authentication token that corresponds to the zero knowledge proof authentication value and includes a blinded value depending upon the private value r and a random value that can be decrypted by the authenticatable device; and/or b) the system is configured to pre-process and convey data to the authenticatable device as part of an extended Boyko-Peinado-Venkatesan generation.

BRIEF DESCRIPTION OF THE DRAWINGS

FIG. 1 is an illustration of the core components of the enrollment and authentication algorithms;

FIG. 2 is an illustration of the derived key tree construction;

FIG. 3 is an illustration of our experimental setup;

FIG. 4 is an illustration of overlapping intra- and inter-PUF error rate distributions;

FIG. 5 is an illustration of separated intra- and inter-PUF error rate distributions; and FIG. 6 is an illustration of the experimentally observed intra- and inter-PUF error rate distributions.

DETAILED DESCRIPTION OF EMBODIMENTS

We review the enrollment and authentication protocols of Frikken et al. The authors consider PUF authentication in the context of banking authentication. The identity of banking clients is proved through a zero knowledge proof of knowledge, which demonstrates that the client knows a password and is in possession of a device capable of generating the discrete logarithm of a pre-enrolled group element. The construction is robust against many forms of attack, including device and server compromise by an adversary. Further, the construction is easily extended to support, panic passwords, where authentication succeeds but the banking server is notified that the client was under duress. We build on a subset of the authors' construction in this work, removing the user and focusing only on authenticating the hardware.

We modify their protocol in two ways. First, we reduce the number of necessary modular multiplications, as the PUF itself resides on a resource-constrained device (i.e., a device having a mathematic computational capability that is comparatively significantly less than that of personal computers widely available at the time of comparison). Second, we modify the enrollment algorithm such that it needs to occur only once. Many PUF-based authentication protocols assume a trusted enrollment stage, where the PUF device interacts with a server without adversarial intervention. As re-enrollment is costly, particularly in large-scale deployed systems, we modify the enrollment protocol to account for future failures or the need to generate additional enrollment tokens.

Overview

Referring to FIG. 1, we first describe the core operations of the present protocols in the context of the primitives used in the construction of the enrollment and authentication protocols of Frikken et al. in terms of the primitives used in the construction.

The enrollment server issues a random challenge C to the device, which is passed as input to the PUF. Let O denote the response of the PUF to challenge C.

The device chooses a random group element, $rand \in \mathbb{G}_p$, and uses the extended BPV generator process (Boyko et al., "Speeding up discrete log and factoring based schemes via precomputations," *Advances in Cryptology EUROCRYPT'98*, vol. 1403 of *Lecture Notes in Computer Science*, pages 221-235, Springer Berlin Heidelberg, 1998) to construct a pair $(r, g^r \mod p)$ that depends critically on the random group element rand, and substantially reduces the number of modular multiplications necessary to construct $g^r \mod p$.

As the PUF output O is noisy, there is no guarantee that when queried on challenge C in the future, the new output O' will satisfy O'=O. However, it is assumed that O and O' will be t-close with respect to some distance metric (e.g. Hamming distance). Thus, an error correcting code may be applied to the PUF output such that at most t errors will still recover O. We apply error correction over the random group element rand, and blind this value with the output of the PUF O, so that the final helper value $P=ECC(rand) \oplus O$ reveals no information about rand. During recovery, computing the exclusive-or of ECC(rand)⊕O⊕O' will return rand whenever O and O' are t-close. This process is referred to as fuzzy extraction, and is described in detail in Section 33.

The pair (P, $g^r$ mod p) is returned to the enrollment server as a commitment to be used for authenticating the device in the future. Note that neither P nor $g^r$ mod p need to be kept secret, as without the PUF output O, the private exponent r cannot be recovered.

When a server wishes to verify the device as authentic, it sends the tuple (C, P, Nonce) to the device, acting as the verifier in the zero knowledge proof protocol of Chaum et al. ("An improved protocol for demonstrating possession of discrete logarithms and some generalizations," *Proceedings of the 6th annual international conference on Theory and Application of Cryptographic Techniques*, EUROCRYPT'87, pages 127-141, Berlin, Heidelberg, 1988, Springer-Verlag). On input the challenge C, the device returns an output O'.

The exclusive-or of the PUF output O' and the error corrected helper data P is run through error decoding. So long as O' and the original PUF output O are t-close, the decoding process will successfully recover the random group element rand.

The group element rand is used as input to the extended BPV generator process, which returns a pair (r, $g^r$ mod p).

After recovering the private exponent r, the device constructs the zero knowledge proof response pair (c', w), acting as the prover. The server acts as the verifier in the zero knowledge proof, and accepts the device as authentic if the pair (c', w) satisfies the proof condition.

We now give a formal description of the modeling assumptions about the PUF, as well as each primitive involved in the enrollment and authentication algorithms.

Model

We consider three principal entity types:

A set of servers $\mathcal{S}$, where each server $s_i \in \mathcal{S}$ controls authentication of devices on its system.

A set of devices $d_i \in \mathcal{D}$, each with an embedded PUF.

An adversary $\mathcal{A}$ that wishes to masquerade as a legitimate device $d_i \in \mathcal{D}$, to obtain resources stored on some subset of the servers $\mathcal{S}' \subseteq \mathcal{S}$.

We assume that all entities are bound to probabilistic polynomial-time (PPT). That is, all entities may perform computation requiring polynomially many operations with respect to a global security parameter $\lambda$. In our setting $\lambda$ refers to the number of bits in the group modulus p. The restriction implies that computation requiring exponentially many operations with respect to $\lambda$ is not efficient for the agents, and will succeed with only negligible probability.

PUF Device

The specific PUF device used in the construction is of critical importance. Rührmair I define three distinct classes of PUF devices:

1. Weak PUF: A weak PUF is typically used only to derive a secret key. The challenge space may be limited, and the response space is assumed to never be revealed. Typical constructions include the SRAM (Holcomb et al., "Initial SRAM state as a fingerprint and source of true random numbers for RFID tags," *In Proceedings of the Conference on RFID Security*, 2007), Butterfly (Kumar et al., "Extended Abstract: The Butterfly PUF protecting IP on every FPGA," *Hardware-Oriented Security and Trust*, HOST 2008, IEEE International Workshop, pages 67-70, 2008) and Coating (Tuyls et al., "Read-proof hardware from protective coatings," *Proceedings of the 8th International Conference on Cryptographic Hardware and Embedded Systems*, CHES'06, pages 369-383, Berlin, Heidelberg, 2006, Springer-Verlag) PUFs.

2. Strong PUF: A strong PUF is assumed to (i) be physically impossible to clone, (ii) impossible to collect a complete set of challenge response pairs in a reasonable time (i.e. on the order of weeks), and (iii) difficult to predict the response to a random challenge.

3. Controlled PUF: A controlled PUF satisfies all of the criteria for strong PUFs, and additionally implements an auxiliary control unit for computing more advanced functionalities.

In our setting, the controlled PUF is the most desirable. Further, we will require that it is physically impossible or at least difficult for an adversary to observe the output of the PUF that is passed to the auxiliary control unit or other intermediate calculations.

Formal PUF Definition

Formally, an ideal PUF construction satisfies Definition 1:

Definition 1. A physically unclonable function $P_d: \{0, 1\}^{\kappa_1} \to \{0, 1\}^{\kappa_2}$ bound to a device d is a function with the following properties:

1. Unclonable: We require that $\Pr[\text{dist}(y, x) \leq t | x \leftarrow U_{\kappa_1}, y \leftarrow P(x), z \leftarrow P'] \leq \epsilon_1$, the probability of duplicating PUF P with a clone PUF P', such that their output distributions are t-statistically close is less than some sufficiently small $\epsilon_1$.

2. Unpredictable: We require that $\text{Adv}_\mathcal{A}^P(\kappa_2) := \Pr[r = r']$, denoting the probability of the adversary $\mathcal{A}$ guessing the correct response r of the PUF P to the challenge c, is negligible in $\kappa_2$ for all probabilistic polynomial time adversaries $\mathcal{A}$.

3. Robust: We require that $\Pr[\text{dist}(y, z) > t | x \leftarrow U_{\kappa_1}, y \leftarrow P(x), z \leftarrow P(x)] \leq \epsilon_2$, the probability of a fixed PUF P yielding responses t-distant on the same input x is less than some sufficiently small $\epsilon_2$. This property is satisfied by binding the PUF device d with a (min, l, t, $\epsilon_3$) fuzzy extractor (Gen, Rep).

4. Fuzzy Extraction: We require that during the enrollment phase for a PUF d, given a challenge c, the PUF computes (R, P) ← Gen(r), where r ← $P_d(c)$ and outputs P. The helper string P allows for R to be recovered when the challenge W' is t-close to the original challenge W.

5. Indistinguishability: We require that the output of the PUF be computationally indistinguishable from a random string of the same length, such that the advantage of a PPT adversary $\mathcal{A}$ is $$\text{Adv}_A^{PUF-IND}(\ell) \leq \frac{1}{2} + \epsilon_3,$$

where $\epsilon_3$ is negligible.

Fuzzy Extraction

The output of a PUF device is noisy, and thus varies slightly despite evaluating the same input. In order to generate a fixed value for a given input over this noisy function, a fuzzy extractor is necessary. In our construction, we implement fuzzy extraction in the auxiliary control unit, such that the output is constant for a fixed input. We now formally define the Hamming distance construction of Dodis et al. ("Fuzzy extractors: How to generate strong keys from biometrics and other noisy data," *SIAM J. Comput.*, pages 97-139, March 2008), based on the fuzzy commitment function by Juels et al. ("A fuzzy commitment scheme,"

*Proceedings of the 6th ACM conference on Computer and Communications Security*, CCS'99, pages 28-36, New York, 1999, ACM), which is used during the enrollment process. Definition 2. Let C be a binary (n, k, 2t+1) error correcting code, and let rand←$\{0, 1\}^k$ be a random k-bit value. Then the following defines a secure sketch for input string O:

$$SS(O; \text{rand}) = O \oplus ECC(\text{rand}) \quad (1)$$

In FIG. 1, Enrollment Challenge [1] illustrates the enrollment server issuing a random challenge C to the device. The challenge is drawn uniformly at random from $\{0, 1\}^k$ for a k-bit challenge.

Definition 2 is used to build the Gen procedure for the enrollment phase, which must output a set ⟨rand, P⟩, where rand is a random value and P is a helper string that is used to recover rand.

---
Algorithm 1 The Gen Algorithm
---

Input : A prime order subgroup q of $\mathbb{Z}_p^*$ where p = 2q + 1; A challenge c
O ← PUF(c)
rand ← random $\in \mathbb{Z}_p^*$, a random group element
P ← O ⊕ ECC(rand)
return ⟨rand, P⟩

---

PUF Query [2] illustrates the hardware device querying the PUF on challenge C, and yielding a response O.

Reducing Modular Multiplications

Modular exponentiation is an expensive operation, hindering the implementation of a PUF-based authentication system on resource-constrained devices, for example a mobile device (i.e., a device capable of being conveniently carried in one hand). We have identified a way to exploit a characteristic of the Frikken et al. protocol to adapt a means of reducing the onboard expense of this operation by an order of magnitude.

A protocol used in other contexts for securely outsourcing modular exponentiations to a server was given by Boyko et al., and their approach is typically referred to as utilizing BPV generators. Nguyen et al. ("Distribution of modular sums and the security of the server aided exponentiation," *Cryptography and Computational Number Theory*, vol. 20 of *Progress in Computer Science and Applied Logic*, pages 331-342, 2001) then gave bounds on the distribution of modular sums, and demonstrated how BPV generators can be extended to reduce the computational load on resource-constrained devices to securely perform modular exponentiation with the aid of a server. Chen et al. ("New algorithms for secure outsourcing of modular exponentiations," *Computer Security*, ESORICS 2012, vol. 7459 of *Lecture Notes in Computer Science*, pages 541-556, Springer Berlin Heidelberg, 2012) give methods to perform simultaneous modular exponentiation, and give a more thorough security analysis of their protocols.

Constructing our PUF-based authentication system with enrollment and authentication protocols that do not impose a specific structure on exponents enabled us to successfully adapt extended BPV generators to reduce the computational cost of computing modular exponentiation, as follows:

Parameter Selection: As suggested by the original authors of BPV generators, for a 256-bit prime p the parameters $\{n=256, k=16\}$ are suggested to maintain the security of the discrete logarithm problem through the corresponding subset sum problem of breaking the BPV generator.

Preprocessing: Generate n random integers $\alpha_1, \ldots, \alpha_n \in \mathbb{Z}_{p-1}$ to serve as exponents under the group $\mathbb{Z}_p^*$. For each j∈[1, ..., n], compute $\beta_j \equiv g^{\alpha_j} \mod p$, where g is the generator for the group $\mathbb{Z}_p^*$. These values are stored in the set $\mathcal{P} = \{(\alpha_1, \beta_1), \ldots, (\alpha_n, \beta_n)\}$. This stage is performed by the server, and the database $\mathcal{P}$ may be publicly revealed. In our setting, $\mathcal{P}$ is stored on the device.

Pair Generation: When a secret pair (x, $g^x \mod p$) is to be generated, a random subset $S \subset [1, \ldots, n]$ is generated such that |S|=k, 1≤k<n. We then compute:

$$x \equiv \sum_{j \in S} \alpha_j \mod(p-1) \quad (2)$$

$$X \equiv \prod_{j \in S} \beta_j \mod p \quad (3)$$

If x≡0 mod (p−1), the set S is randomly regenerated until this equivalence does not hold. The secret pair is then (x, X). Thus, we have constructed the PairGen function, given by Algorithm 2, where $f'(\bullet)$ is defined in Equation 4.

---
Algorithm 2 The Pair Generation Algorithm
---

$\mathcal{P} = \{(\alpha_1, \beta_1), \ldots, (\alpha_n, \beta_n)\}$
$\mathbb{G}_p$, a group of prime order
n, the number of bits in the modulus
k, the size of the subset
p, the prime group modulus
S ← random $\subseteq [1, \ldots, n] = f'(R)$ to be kept secret
x ← $\alpha_{S_1}$
X ← $\beta_{S_1}$
for 1 < j ≤ k do
    x ← x + $\alpha_{S_j}$ mod (p − 1)
    X ← X · $\beta_{S_j}$ mod p
end for
return (x, X)

---

As PairGen(•) outputs a pair (x, X) we denote by PairGen$_x$(•) the output x, and similarly denote by PairGen$_X$(•) the output X=($g^x \mod p$). Note that X need not be private, while the private exponent x must not be revealed.

The use of BPV generators results in a substantial reduction in the number of modular multiplications required to compute a secret pair (x, $g^x \mod p$). For a 256-bit prime p, the square-and-multiply algorithm requires 1.5n modular multiplications for an n-bit exponent to perform modular exponentiation. Thus, rather than requiring 384 modular multiplications, use of a BPV generator requires only 15, an improvement of an order of magnitude.

In our construction, the device is required to generate a specific pair (x, $g^x \mod p$) that is dependent on the output of the PUF(•) function. In the enrollment protocol (Algorithm 3), the generation function (Algorithm 1) takes as input a challenge c and returns a pair ⟨rand, P⟩ that depends on the output of PUF(c). The value rand is a randomly selected group element of $\mathbb{G}_p$, which may be recovered by the PUF when given the same challenge c and the helper string P. Thus, we need the output of PairGen(n, k) to depend critically on the private value rand so that the same pair (x, X) is generated for a fixed challenge. We accomplish this by defining a deterministic function $f'(R) \mapsto S$ for generating the set of indices S from the recovered value rand. Specifically, we define $f'(\bullet)$ as follows:

$$f'(R): \begin{cases} S_1: H_1(R) \quad \text{mod } n \\ \ldots \quad \ldots \\ S_k: H_n(\ldots H_1(R)) \quad \text{mod } n \end{cases} \mapsto S \quad (4)$$

Thus, the set of k indices S is generated through a hash chain over R, reduced modulo the total number of pairs, n. In our implementation, H(•) is the SHA-256 hash algorithm. As the group element rand is secret, knowledge of the definition of $f'(•)$ and the complete set $\mathcal{P} = \{(\alpha_1, \ldots \beta_1), \ldots, (\alpha_n, \beta_n)\}$ does not yield an advantage to any probabilistic polynomial-time adversary $\mathcal{S}$. We redefine function PairGen(•, •) to accept the index argument R and a set $\mathcal{P} = \{(\alpha_1, \beta_1), \ldots, (\alpha_n, \beta_n)\}$.

Referring still to FIG. 1, BPV Generation [3] illustrates the device choosing a random group element rand$\in \mathbb{G}_p$, and using the extended BPV generator process to construct a pair (r, $g^r$ mod p) that depends critically on the random group element rand, which substantially reduces the number of modular multiplications necessary to construct $g^r$ mod p.

Error Correction [4] illustrates the hardware device employing error correction. As the PUF output O is noisy, there is no guarantee that when queried on challenge C in the future, the new output O' will satisfy O'=O. However, it is assumed that O and O' will be t-close with respect to some distance metric (e.g. Hamming distance). Thus, an error correcting code may be applied to the PUF output such that at most t errors will still recover O. We apply error correction over the random group element rand, and blind this value with the output of the PUF O, so that the final helper value P=ECC(rand)⊕O reveals no information about rand. During recovery, computing the exclusive-or of ECC(rand)⊕O⊕O' will return rand whenever O and O' are t-close. This process is referred to as fuzzy extraction.

Enrollment Data Tuple [5] illustrates the hardware device constructing the pair (P, $g^r$ mod p), consisting of helper data P to be used for error decoding, and a commitment $g^r$ mod p to the exponent r. Note that neither P nor $g^r$ mod p need to be kept secret, as without the PUF output O, the private exponent, r cannot be recovered.

Store Enrollment [6] illustrates the server storing the hardware device enrollment token (P, $g^r$ mod p) for use in future authentication protocols.

The enrollment phase collects a series of n tokens $\{(c_1, P_1, g^{r_1} \bmod p), \ldots, (c_n, P_n, g^{r_n} \bmod p)\}$ from the PUF device in response to challenge queries by the server. The authentication tokens serve as commitments so that the device can be authenticated in the future. Note that no sensitive information is transmitted over the communication channel or stored in non-volatile memory. The private exponent r is generated by the device, and discarded after construction of $g^r$ mod p. When the exponent r is needed to authenticate the device through a zero knowledge proof protocol, an enrollment token $(c_i, P_i, g^{r_i} \bmod p)$ allows the device to regenerate r and complete the proof. This provides a substantial benefit over alternative PUF authentication protocols, such as the naïve challenge-response protocol or a PKI construction, as both require private information to be stored in non-volatile memory.

Algorithm 3 describes the enrollment protocol in pseudo-code.

Ideally, the enrollment process should be required only once, while the device is in a trusted environment at the manufacturer. Further, this process must ensure that in the event of a security breach, the device can remain active without re-enrollment through a minor change on the server side. We realize this property by constructing a challenge-response tree, where only the root node is directly derived from a PUF response. This minimizes the impact of an adversary succeeding in solving the discrete logarithm problem (e.g., when the modulus is small, as in our current implementation).

To prevent such an attack from forcing a re-enrollment process,

---

Algorithm 3 The Enrollment Algorithm for Server s do
  p ← 2q + 1 where p, q ∈ prime
  g ← random ∈ $\mathbb{G}_q$, a random group element while $g^{\frac{p-1}{2}} \not\equiv -1 \bmod p$ do g ← random ∈ $\mathbb{G}_q$, a random group element
  end while
end for
for 1 ≤ i ≤ n do
  for Server s do
    $c_i$ ← random ∈ $\mathbb{G}_p$, a random group element
    Device d ← $\{c_i, p, g\}$
  end for
  for PUF Device d do
    x = H($c_i$, p, g)
    $\langle R_i, P_i \rangle$ ← Gen(f(x)) where f(·) is the PUF function and Gen is Algorithm 1
    helper$_i$ = $P_i$
    token$_i$ = $g^{r_i}$ mod q = PairGen$_X$(f($R_i$), $\mathcal{P}$)
    Server s ← {token$_i$, helper$_i$}
  end for
  for Server s do
    Store new enrollment entry $\{c_i, (g^{r_i} \bmod p), P_i\}$
  end for
end for

--- we generate derived tokens from those collected during enrollment. Should an adversary succeed in solving the discrete logarithm problem, the recovered exponent will not help an adversary masquerade as the device to a server with a different derived token. The tiered authentication structure is as follows:

Definition 3. The complete verification set (CVS) is defined to be the set $\{(c_1, P_1, g^{r_1} \bmod p), \ldots, (c_n, P_n, g^{r_n} \bmod p)\}$, where $r_i$ is linked to the PUF output through the Rep protocol (Algorithm 4).

The CVS consists of a set of challenges and their associated PUF responses, where the secret $r_i$, known only given access to the PUF, is hidden in the exponent. From this set of root challenge-response pairs, we derive a tree structure for tiered authentication.

Definition 4. The working verification set (WVS) is a subset of the CVS, distinguished by the choice of a single root challenge-response pair $(c_i, P_i, g^{r_i} \bmod p)$, where this pair serves as the root of the authentication tree.

In FIG. 2, Working Verification Set [13] illustrates the selection of a member of the complete verification set to serve as the working verification set.

A given WVS chooses a single pair $(c_i, P_i, g^{r_i} \bmod p)$ from the CVS. This pair will serve as the root of the authentication tree. We now describe how child nodes of this root value are derived.

Definition 5. A limited verification set (LVS) is a subset of the WVS, derived from the rot node by constructing the authentication set $\langle g^{r_i e_i} \bmod p, c_i, P_i, E_{H(g^{r_i} \bmod p)}(e_i) \rangle$.

To create a child node, the root node chooses a random value $e_i \in \mathbb{Z}_{p-1}$ and constructs $g^{r_i e_i}$ mod p. This value hides the root node $g^{r_i}$, as the child node cannot decrypt $E_{H(g^r_i \bmod p)}(e_i)$ to recover $e_i$. The encryption function is defined as:

$$E_k(x) = x \oplus k \quad (5)$$

Derived Exponent [14] illustrates the generation of a random exponent $e_i$, which is used to generate the derived token $\langle g^{r_i e_i} \bmod p, c_i, P_i, E_{H(g^r_i \bmod p)}(e_i) \rangle$. The random exponent $e_i$ blinds the root exponent $r_i$.

We require that the child node is unable to generate the key, yet the PUF device must be able to decrypt the exponent $e_i$ to successfully prove knowledge of the exponent in the zero knowledge proof. We use $H(g^{r_i} \bmod p)$ as the key, as the PUF can recover $(r_i, g^{r_i} \bmod p)$ using $c_i$ through the Gen protocol (Algorithm 1). The derivation structure for the verification sets is illustrated in FIG. 2.

Derived Enrollment Token [15] illustrates the derived token to be distributed to other servers. The token $\langle g^{r_i e_i} \bmod p, c_i, P_i, E_{H(g^r_i \bmod p)}(e_i) \rangle$ allows another server to authenticate the device, while revealing nothing about the root exponent $r_i$. Even if the derived token is compromised (revealing $r_i e_i$), no information about $r_i$ is obtained, which prevents an adversary from masquerading as the hardware device to any server other than the one in possession of $g^{r_i e_i} \bmod p$.

By only distributing derived tokens, an adversary $\mathcal{A}$ able to solve the discrete logarithm problem recovers only $r_i e_i$ mod (p−1). However, this does not allow $\mathcal{A}$ to masquerade as the device with any other server, as each derived exponent $e_i$ is randomly generated. In order to impersonate the device with a different server, $\mathcal{A}$ must solve another discrete logarithm problem. Further, recovering a derived exponent $r_i e_i$ yields $\mathcal{A}$ no advantage in attempting to recover $r_i$, the root exponent. Rather than forcing a re-enrollment, the root server simply issues a new derived token to the compromised child server.

Returning to FIG. 1, Authentication Challenge [7] illustrates a server attempting to authenticate a hardware device. The server sends the tuple (C, P, Nonce) to the device, acting as the verifier in the zero knowledge proof protocol of Chaum et al.

We now define the Rep procedure such that, on input O' where dist(O, O')≤t, the original PUF output rand may be recovered:

Definition 6. Let D be the decoding scheme for the binary (n, k, 2t+1) error-correcting code ECC, and let O' be an input such that dist(O, O')≤t. Then Rep is defined as:

$$\text{Rep}(O', P) = D(P \oplus O')$$
$$= D(O \oplus \text{ECC}(\text{rand}) \oplus O')$$
$$= \text{rand}$$

From Definition 6, we can now describe the Rep algorithm that allows a PUF output O' that differs from the original output O by at most t to reproduce output rand such that Rep(O')=rand using the public helper string P=O⊕ECC(rand):

---
Algorithm 4 The Rep Algorithm
---
Input : A challenge c, Helper string P
O' ← PUF(c)
rand ← D (P ⊕ O')
return rand
---

We use the Gen and Rep algorithms in the Enrollment and Authentication protocols to ensure that the same random value rand is recovered so long as the PUF outputs O, O' differ by at most t bits.

PUF Recovery [8] illustrates the hardware device querying the PUF on challenge C, and returning output O', where O' is not necessarily equal to O. If the device is authentic, verification will succeed when O' differs from O by at most t-bits, where a t-bit error correcting code is used.

Error Correction Removal [9] illustrates the hardware device removing the error correction to recover the random group element. The exclusive-or of the PUF output O' and the error corrected helper data P is run through error decoding. So long as O' and the original PUF output O are t-close, the decoding process will successfully recover the random group element rand.

BPV Regeneration [10] illustrates the hardware device using the group element rand as input to the extended BPV generator process, which returns a pair $(r, g^r \bmod p)$.

Zero Knowledge Proof [11] illustrates the hardware device constructing a zero knowledge proof receipt. After recovering the private exponent r, the device constructs the zero knowledge proof response pair (c', w), acting as the prover.

Verify Zero Knowledge Proof [12] illustrates the server attempting to verify the zero knowledge proof receipt (c', w). The server acts as the verifier in the zero knowledge proof, and accepts the device as authentic if the pair (c', w) satisfies the proof condition.

The authentication phase allows a server to verify that a client device is authorized to issue a request. Upon receiving a request from a device, the server engages in Chaum et al.'s zero knowledge proof protocol with the device d to establish permission to perform the request. The protocol is given as pseudocode in Algorithm 5.

---
Algorithm 5 The Authentication Algorithm
---
for PUF Device d do
    Server s ← request
end for
for Server s do
    Device d ← {c, g, p, P, N} where N is a nonce and P is the helper string
end for
for PUF Device d do
    x ← H(c, g, p)
    R ← Rep(f(x), P) where f (·) is the PUF output function and Rep is Algorithm 4
    $v_{par}$ ← random ∈ $\mathbb{G}_p$, a random group element
    v ← PairGen$_x$(f($v_{par}$), $\mathcal{P}$)
    w ← v − c'(r = PairGen$_x$(f(R), $\mathcal{P}$)) mod p
    t' ← $g^v$ mod p = PairGen$_x$(f($v_{par}$), $\mathcal{P}$)
    c' ← H(g, $g^r$ mod p = PairGen$_x$(f(R), $\mathcal{P}$), t', N)
    Server s ← {c', w}
end for
for Server s do
    t' ← $g^w \cdot g^{rc'}$ mod p
    h = H(g, $g^r$, $g^w \cdot g^{rc'}$ mod p, N)

Device d ← $\begin{cases} \text{accept:} & c' = h \\ \text{deny:} & c' \neq h \end{cases}$ end for
---

Implementation

As seen in FIG. 3, we implemented our protocol on a Xilinx Spartan 6 FPGA SP605 development board as a proof of concept. One of ordinary skill will readily recognize how to adapt the hardware modular math engine to accept larger moduli, preferably at least 1024 bits. Both the PUF and modular math engine reside in the FPGA fabric, while all other operations were performed in software using the MicroBlaze processor. The device communicates with a desktop server over an RS232 connection. The enrollment and authentication protocols for the device and server were written in C, with a Java front end on the server side for the user interface and communicating with a local SQL database.

Error Correcting Code

Ideally, the inter-PUF error rate between two separate PUFs on the same challenge should be approximately 50%, while the intra-PUF error rate on a challenge should be substantially less. The greater the distance between these two distributions, the less likely false positives and false negatives are to occur. FIG. 4 illustrates the possible relationship between the inter-PUF and intra-PUF error in the case where the distributions overlap, making it impossible to avoid false positives and false negatives. FIG. 5 illustrates more distant distributions, where establishing a boundary to minimize false positives and false negatives is simpler. Finally, FIG. 6 illustrates the true inter-PUF and intra-PUF error rates we observed experimentally using three Xilinx development boards. The observed inter-PUF error rate has ($\mu$=129, $\sigma$=5), which satisfies the ideal error rate of approximately half of the output bits differing. The observed intra-PUF error rate has ($\mu$=15, $\sigma$=4).

Error decoding is the most computationally expensive operation that must be performed on the device. Our implementation chose a (n, k, 2t+1) BCH code (Bose et al., "On a class of error correcting binary group codes," *Information and Control*, pages 68-79, 1960), where the code has length n, accepting original data of length at most k and correcting at most t errors. As we extract 256 bits from the PUF, originally a (1023, 668, 73) BCH code was used, so that up to 36 errors could be corrected. However, the PUF itself has only 32 bits, so to extract 256 bits the PUF is queried eight times. Rather than perform error correction over the 256 bit concatenated output, we use a (127, 71, 17) BCH code over each 32 bit output block. This change substantially reduces the size of the generating polynomial, which improved decoding speed despite having to run eight times, rather than once.

A benefit of this change is that a total of 64 bits may now be corrected in the PUF output while simultaneously reducing the decoding time. This comes at the price of only being able to correct 8 errors per 32-bit block, as the error correction code is now defined for block sizes of 32 bits, rather than 256 bits. Thus, the error correcting code handling up to 64 errors is likely to capture all of the intra-PUF error without introducing false positives by "correcting" inter-PUF error. On the other hand, while this gives the appearance of a 256-bit function, its security is equivalent to a brute force search over $2^{32}$ elements. Thus, rather than attack a presumed 256-bit function, an adversary with some knowledge of the system could attack a 32-bit permutation and combine each smaller challenge-response pair block to generate the full PUF mapping. Consequently, it would be preferred to use a PUF accepting a 1024-bit input in a deployed system.

We experimentally determined the total time necessary for each operation, including storage and retrieval of values from a SQL database on the server, and communication between the device and the server. The server is equipped with an 8-core 3.1 GHz processor and 16 GB of RAM. Table 1 reports the average time per protocol over 1000 trials.

We note that all experiments had a 0% false positive and

TABLE 1

Performance Results

| Protocol | Average Runtime | St. Dev. |
|---|---|---|
| Enrollment | 1.2791 seconds | 0.0603 |
| Authentication | 1.3794 seconds | 0.0602 |
| Derived Authentication | 1.4480 seconds | 0.0620 | false negative rate. By setting the maximum error correction threshold at 64 bits, we are able to perfectly distinguish between PUF devices. However, in a deployed system, environmental factors may affect the intra-PUF error rate. If the intra-PUF error rate increases beyond the error correction threshold, the introduction of false negatives is inevitable.

A frequent concern about deploying PUFs in large scale authentication systems is that they may not be robust to varying environmental conditions. As the PUF hardware ages, the number of errors present in the responses is expected to increase. Maiti et al. ("The impact of aging on an FPGA-based physical unclonable function," *Field Programmable Logic and Applications (FPL)*, 2011 *International Conference*, pages 151-156) study the effects of simulated aging on PUF hardware by purposefully stressing the devices beyond normal operating conditions. By varying both temperature and voltage, the authors were able to show a drift in the intra-PUF variation that, over time, will lead to false negatives. We mitigate this inevitable drift by choosing the error correction threshold to maximize its distance from both the intra- and inter-PUF error distributions.

In authentication systems, false negatives tend to be less damaging than false positives. Maiti et al. note that the error drift strictly affected the intra-PUF error rate distribution. Thus, there is a tendency for intra-PUF error rates to drift towards the maximum entropy rate of 50%. This inevitability should be considered when determining the re-enrollment cycle or the device lifespan.

What is claimed is:

1. An authentication system for managing a plurality of physically unclonable function ('PUF') devices, the authentication system comprising:
an enrollment server configured to:
communicate challenges to the plurality of PUF devices;
receive, responsive to communicating a challenge to a respective PUF device, a commitment for subsequent authentication of the respective PUF device, the commitment including at least a blinded value, and a second first value, wherein the blinded value depends on a private value r exponentially, a random value, and unique physical properties of the respective PUF device, the blinded value defining a mapping for repeated generation of the private value r, and the first value depends on the private value r, and the random value;
communicate a verification request including the challenge, the blinded value, and a nonce to the respective PUF device, wherein the challenge and the blinded value are configured to enable repeated regeneration of the random value at the respective PUF device based on a repeatable key or secret generator;

receive an authentication token communicated from the respective PUF device, the authentication token generated at the respective PUF device based on the private value r and the nonce; and verify the authentication token based on the at least part of the commitment for subsequent authentication.

2. The authentication system of claim 1, wherein the enrollment server is configured to generate the random value.

3. The authentication system of claim 1, wherein the enrollment server is configured to encrypt the random value with a key that is shared with the respective PUF device.

4. The authentication system of claim 1, wherein the commitment includes an exponential function of the private value r.

5. The authentication system of claim 1, wherein the blinded value encodes error correction information.

6. The authentication system of claim 1, wherein the commitment includes an exponential function of the private value r and wherein the blinded value depends on a value of the exponential function.

7. The authentication system of claim 1, wherein the enrollment server is further configured to select the random value as an element of a group of prime order.

8. The authentication system of claim 1, wherein the enrollment server is configured to generate a limited verification set that includes the challenge and the authentication token.

9. The authentication system of claim 8, wherein the limited verification set further includes an error-correction helper string, and the commitment includes a dependency upon the error-correction helper string.

10. The authentication system of claim 8, further comprising an authentication server having the limited verification set; and
wherein the enrollment server is configured to communicate an authentication request through the authentication server, by triggering communication of the challenge, the blinded value, and a nonce to the respective PUF device by the authentication server.

11. The authentication system of claim 8, wherein the enrollment server is configured to trigger communication of the verification request through a plurality of authentication servers each having a different limited verification set, wherein each limited verification set includes the challenge and a corresponding token that is specific to the particular authentication server.

12. The authentication system of claim 1, wherein the enrollment server has a complete verification set that includes multiple different specific challenge values and the PUF device's corresponding commitment values.

13. The authentication system of claim 1, wherein the enrollment server stores challenge values and corresponding commitment values for multiple PUF devices.

14. The authentication system of claim 1, wherein the physical properties of the respective PUF device include a respective physically-unclonable function ('PUF') in the PUF device.

15. The authentication system of claim 14, wherein the PUF of the PUF device is constructed and arranged in a field-programmable gate array.

16. The authentication system of claim 1, further comprising a PUF device having a physically-unclonable function ('PUF') capable of generating an output O dependent on the physical properties of the respective PUF device.

17. The authentication system of claim 16, wherein the PUF is constructed and arranged within a field-programmable gate array.

18. An authentication system for managing a plurality of PUF devices the authentication system comprising:
an enrollment server that stores a working verification set including:
a commitment received from a respective PUF device for subsequent authentication, the commitment including:
at least a blinded value, and a first value, wherein:
the blinded value depends on a private value r exponentially, a random value, and unique physical properties of the respective PUF device, the blinded value defining a mapping for repeated generation of the private value r; and
the first value depends on the private value r, and the random value; and
a challenge associated with the commitment, wherein the challenge and the blinded value are configured to enable repeated regeneration of the random value at the respective PUF device based on a repeatable key or secret generator; and
the enrollment server is configured to pre-process and convey data to the respective PUF device as part of a repeatable Boyko-Peinado-Venkatesan generation, and wherein the random value once regenerated can be processed as an input to the repeatable Boyko-Peinado-Venkatesan generation.

19. The authentication system of claim 18, wherein the data includes exponents for a prime group.

20. The authentication system of claim 19, wherein the data includes a group generator.

21. The authentication system of claim 18, wherein the data includes an error-correction helper string, and wherein the commitment includes dependency upon the error-correction helper string.

22. The authentication system of claim 18, further comprising an authentication server.

23. The authentication system of claim 18, wherein the enrollment server is configured to pre-process and convey data to an authenticatable server as part of the repeatable Boyko-Peinado-Venkatesan generation.

24. The authentication system of claim 23, wherein the data includes exponents for a prime group, and a group generator.

25. The authentication system of claim 18, wherein the physical properties of the respective PUF device include a respective physically-unclonable function ('PUF') in the PUF device.

26. A physically-unclonable function ('PUF) device for use with an authentication system, comprising:
an internal input and an internal output constructed and arranged so as to, in response to the internal input of a specific challenge C, generate an internal output O that is characteristic to the device and the specific challenge C;
a processor having a processor input that is connected to the internal output, the processor configured to:
in response to the receipt of an output O from the internal output triggered by a challenge, generate a commitment, the commitment including:
at least a blinded value, and a first value, wherein:
the blinded value depends upon a private value r exponentially, a random value, and physical properties of the respective PUF device, the blinded value defining a mapping for repeated generation of the private value r, and the first value depends on the private value r, and the random value;

communicate the commitment to an enrollment server or authentication server;

in response to receipt of an authentication query that includes a nonce, the blinded value, and the challenge associated with the commitment, regenerate the random value to construct an authentication token that is based on the private value r and the nonce; and communicate the authentication token for verification based on at least part of the commitment for subsequent authentication.

27. The PUF device of claim 26, further comprising a physically-unclonable function ('PUF') having a PUF input and a PUF output, wherein the PUF input is the internal input and the PUF output is the internal output, and wherein the output O is characteristic to the PUF.

28. The PUF device of claim 27, wherein the blinded value of the commitment includes an error-correction helper string.

29. The PUF device of claim 27, further comprising a field-programmable gate array ('FPGA'), wherein the PUF resides in the FPGA.

30. The PUF device of claim 29, wherein the FPGA is part of a Spartan®-6 FPGA SP605 development board.

* * * * *